United States Patent
Miura et al.

[11] Patent Number: 5,609,345
[45] Date of Patent: Mar. 11, 1997

[54] METAL GASKET WITH STEPPED INTERMEDIATE PLATE

[75] Inventors: Masahiko Miura, Kawachinagano; Tadayoshi Akutsu, Fujisawa; Kazukuni Takada, Ibaragi; Kunitoshi Inoue, Higashiosaka; Kenji Kubouchi, Hirakata; Yoshikazu Shinpo, Nisshin; Kazuya Nakata, Toyota, all of Japan

[73] Assignee: Nippon Gasket Co., Ltd., Osaka-fu, Japan

[21] Appl. No.: 501,662

[22] Filed: Jul. 12, 1995

[30] Foreign Application Priority Data

Aug. 5, 1994 [JP] Japan .................................. 6-202922
Jan. 27, 1995 [JP] Japan .................................. 7-030213

[51] Int. Cl.⁶ .................................................. F16J 15/08
[52] U.S. Cl. ................................. 277/180; 277/235 B
[58] Field of Search ........................... 277/180, 235 A, 277/235 B

[56] References Cited

U.S. PATENT DOCUMENTS

| | | |
|---|---|---|
| 5,205,566 | 4/1993 | Ueta et al. . |
| 5,211,408 | 5/1993 | Udagawa ............... 277/235 B |
| 5,286,039 | 2/1994 | Kawaguchi et al. ........ 277/235 B |

FOREIGN PATENT DOCUMENTS

| | | |
|---|---|---|
| 0306766 | 3/1988 | European Pat. Off. . |
| 544951 | 6/1993 | European Pat. Off. ........... 277/235 B |
| 574770 | 12/1993 | European Pat. Off. ........... 277/235 B |
| 0594322 | 4/1994 | European Pat. Off. . |
| 62-155374 | 7/1987 | Japan . |
| 62-181756 | 11/1987 | Japan . |
| 63-62668 | 4/1988 | Japan . |
| 63-293363 | 11/1988 | Japan . |
| 64-4838 | 1/1989 | Japan . |
| 64-65367 | 3/1989 | Japan . |
| 4-66457 | 6/1992 | Japan . |

*Primary Examiner*—Scott Cummings
*Attorney, Agent, or Firm*—Browdy and Neimark

[57] ABSTRACT

This metal gasket comprises a pair of bead plates on which beads are formed so as to extend along the circumferences of combustion chamber holes, and an intermediate plate interposed between the bead plates. The intermediate plate is provided on the parts thereof which are closer to the combustion chamber holes than to the beads on the bead plates with stopper portions comprising stepped portions. These stopper portions constitute compensation portions for the beads on the bead plates. The compensation portions prevent a total compression of the beads on the bead plates when the metal gasket is tightened, offset the irregularity of opposed surfaces of a cylinder head and a cylinder block, improve the sealability with respect to the beads, and protect the beads against corrosion and compression.

11 Claims, 9 Drawing Sheets

METAL GASKET WITH STEPPED INTERMEDIATE PLATE

BACKGROUND OF THE INVENTION

1. Field of the Invention

This invention relates to a metal gasket adapted to seal a narrow clearance between opposed surfaces of a cylinder head and a cylinder block and a narrow clearance between the cylinder head and an exhaust manifold, and comprising bead plates on which beads extending along combustion chamber bores and combustion gas bores are formed, and an intermediate plate interposed between the bead plates.

2. Description of the Prior Art

A conventional engine comprising a cylinder head and a cylinder block which are formed out of an aluminum alloy has small weight but a low rigidity. Therefore, relative displacement occurring between the cylinder head and cylinder block during an operation of the engine tends to become larger. In recent years, a metal gasket used for sealing a narrow clearance between a cylinder head and a cylinder block and formed by elastic metal plates is known on which beads are formed on the portions thereof which are in the vicinity of circumferences of holes therein made correspondingly to combustion chambers, water bores and oil bores.

In a conventional metal gasket disclosed in Japanese Patent Laid-Open No. 155374/1987, an intermediate plate is laminated on a compensation plate provided with combustion chamber holes, and edge portions of the combustion chamber holes in the compensation plate are folded, bead-carrying elastic metal plates being laminated on the compensation plate and intermediate plate, compensating portions of a predetermined thickness for preventing an increase and a decrease in the size of a clearance between deck surfaces being provided on the portions of the elastic metal plates which extend from the beads toward the combustion chamber holes.

As shown in FIG. 27, a metal gasket disclosed in Japanese Patent Laid-Open No. 293363/1988 is formed by laminating intermediate plates 45, 46 on each other between bead plates 41, 42 formed by elastic metal plates and having annular beads 43, 44 thereon which extend along the circumferential edges of combustion chamber holes 40 so that ridge portions of the beads are opposed to each other, and firmly fitting spacer members 47 between the portions of the intermediate plates 45, 46 which are closer to the combustion chamber holes 40 than the portions of the same which the beads 43, 44 contact. This metal gasket is provided with spacer members 47 fitted firmly between the regions of the intermediate plates 45, 46 which are closer to the combustion chamber holes 40 than the portions of the same which the beads 43, 44 contact.

As shown in FIG. 28, a metal gasket disclosed in Japanese Patent Laid-Open No. 65367/1989 is formed by laminating intermediate plates 55, 56 on each other between bead plates 51, 52 formed by elastic metal plates and having annular beads 53, 54 thereon which extend along the circumferential edges of combustion chamber holes 50 so that ridge portions of the beads are opposed to each other, and embracing a hole edge portion 57 of the intermediate plate 55 in that 58 of the intermediate plate 56 so as to form a grommet-like part of a stepped structure, whereby a folded portion 59 for offsetting the irregularity of a clearance between opposed surfaces is provided. In this metal gasket, substantially identical stepped portions are provided on the surfaces of the intermediate plates 55, 56, and the folded portion 59 works as a shim with respect to the beads 53, 54, when the bead plates 51, 52 are tightened onto the intermediate plates.

As shown in FIG. 29, a metal gasket disclosed in Japanese Utility Model Laid-Open No. 66457/1992 is formed by laminating intermediate plates 65, 66 on each other between bead plates 61, 62 formed by elastic metal plates and having annular beads 63, 64 thereon which extend along the circumferential edges of combustion chamber holes 60 so that ridge portions of the beads are opposed to each other, forming stepped portions 67, the height of which is less than the thickness of the intermediate plate 66, on the intermediate plate 65 so that the stepped portions extend along edge portions of the combustion chamber holes, engaging the portions of the intermediate plate 66 which is opposed to a non-stepped portion of the intermediate plate 65 with an outer surface of a recessed surface, which occurs due to the formation of the stepped portions 67, and forming compensation portions 69, the thickness of which is larger than the sum of the thicknesses of the portions of the two intermediate plates which the ridges of the beads contact, around the circumferences of the combustion chamber holes 60 by folding edge portions of the intermediate plate 66 between hole-edge portions of the intermediate plates 66, 65.

As described above, two intermediate plates are basically required in a conventional metal gasket to provide the gasket with compensation portions having the function of preventing a total compression of the beads on the portions of two bead plates which are at the circumferences of the combustion chamber holes, and the function of offsetting the irregularity of the opposed surfaces of the cylinder block and cylinder head which occurs when the gasket is tightened. A conventional metal gasket is provided with such compensation portions by using additional members, such as spacers or by folding parts of metal plates constituting the intermediate plates. This causes an increase in the number of parts and the number of steps, such as a welding step and a bonding step of a gasket manufacturing process, requires quality management concerning the precision of the compensation portions, and causes cracks and permanent set in fatigue to occur in the folded portions. This would result in an increase in the manufacturing cost.

A conventional metal gasket having one intermediate plate interposed between elastic metal plates is disclosed in, for example, Japanese Utility Model Laid-Open Nos. 4838/1989, 181756/1987 and 62668/1988. The intermediate plate disclosed in these publications has bulging portions or grooves for use in preventing the beads formed on the elastic metal plates from being totally compressed. However, such an intermediate plate is not formed to a uniform thickness due to the bulging portions of grooves, and, moreover, these bulging portions or grooves do not have the bead sealing function.

SUMMARY OF THE INVENTION

A primary object of the present invention is to solve these problems, and provide a metal gasket formed by providing one intermediate plate of a uniform thickness with stepped portions which constitute seal portions serving also as stopper portions, whereby the stepped portions function as compensation portions of the intermediate plate for bead plates, and setting the height of the stopper portions which function as compensation portions to an arbitrary level to keep the surface pressure balance proper, reduce the stress fluctuation of the bead plates and the bending stress imparted to the compensation portions, and prevent the breakage of the beads and compensation portions and a decrease in the sealability thereof; and capable of varying the shapes of the stepped portions of the intermediate plate depending upon the regions of the gasket along holes, such as combustion chamber holes and combustion gas holes and with respect to the positional relation between the holes and bolts or intermittently, i.e., partially forming the stepped portions to have the stopper portions display the bead sealing effect, and protecting the beads by preventing the beads from being totally compressed and preventing the occurrence of permanent set in fatigue and corrosion thereof.

Another object of the present invention is to provide a metal gasket having a pair of bead plates formed by elastic metal plates on which beads are formed along the circumferences of parallelly arranged holes, and an intermediate plate interposed between the bead plates provided with beads in an opposed state, characterized in that the intermediate plate is provided on the regions thereof which extend along at least the inner sides of the beads with stepped portions which are bent and extend smoothly and continuously toward one bead plate at a height smaller than that of the beads, and which constitute sealing function-carrying stopper portions.

This metal gasket has bead plates and intermediate plate, and the intermediate plate is provided on the regions thereof which are closer to the holes (on the inner sides of) than to the beads with first stopper portions formed by first stepped portions extending toward one bead plate and having a height smaller than that of the beads, and on the regions thereof which are closer to the holes (on the inner sides of) than to the first stepped portions with second stopper portions extending toward the other bead plate and having a height larger than that of the first stepped portions and smaller than the sum of the height of the first stepped portions and that of the beads.

Both surfaces of the single intermediate plate in this metal gasket which the beads on the two bead plates contact are provided with compensation portions, which have the function of preventing the total compression of the beads on the bead plates and offsetting the irregularity of opposed surfaces of the plates and the function of sealing the beads for protecting the same, due to the bead plates facing the intermediate plate with clearances left therebetween when the plates are in a free state, i.e., in an untightened state. The annular portions among the first and second stepped portions, i.e. the first stopper portions constitute the first compensation portions which prevent the total compression of the beads with respect to one bead plate and improve the sealability, while the annular portions which are closer to the holes than to the second stepped portions, i.e. the second stopper portions prevent the total compression of the beads with respect to the other bead plate and improve the sealability.

Especially, the stepped portions of the intermediate plate in this metal gasket are formed in the smoothly and continuously bent and extending sealing function-carrying stopper portions. Accordingly, when the metal gasket is tightened, stress is not concentrated locally on the stepped portions of the intermediate plate, and cracks and permanent set in fatigue do not occur in these portions. Also, the bead sealing function of these portions and the function thereof as stoppers do not lower. In this metal gasket, the first and second stepped portions are formed on different parts of the intermediate plate, so that none of the upper and lower surfaces of the first and second stepped portions of the intermediate plate are clamped by the bead plates. Therefore, the surface pressure at the first and second stepped portions is maintained at a proper level, and the sealability of the same stepped portions with respect to the beads on the bead plates can be improved.

Since the intermediate plate in this metal gasket is formed to a thickness which is not less than twice as large as that of the bead plates, preferably around 3–5 times as large as the same, it is possible to prevent the excessive compression of the beads and the occurrence of permanent set in fatigue and cracks therein, prevent the flow of a combustion gas toward the beads by the stopper portions and protect the beads against the high-temperature gas which cause the beads to be corroded, and thus prevent the function of the beads from lowering. The stopper portions are made higher in the regions among the holes, and lower in the regions other than the mentioned regions. In another mode of the metal gasket, the stopper portions are made higher in the regions among the holes and the regions on lines passing the centers of the holes and extending perpendicularly to a center line passing the centers of the holes, and lower in the other regions. The stopper portions have smoothly curved surfaces and varying height in boundary regions between the high regions and low regions. The stopper portions are formed intermittently along the circumferences of the holes.

The stopper portions of the intermediate plate can be formed properly to a height of, for example, around not more than 0.015 mm. Although the stopper portions can be formed to a uniform height on the intermediate plate, they can also be formed to larger and smaller heights depending upon the regions along the circumferences of the holes in some cases. The height of the stopper portions can be set larger or smaller correspondingly to the deformation of the engine, for example, the surface deformation of a cylinder head and a cylinder block, or the deformation of mounting surfaces between the cylinder head and an exhaust manifold, and the deformation of the engine due to the heat and explosion during an operation thereof. In this metal gasket, the stopper portions can be formed continuously, or partially or intermittently along the circumferences of the holes. The stoppers can be formed so as to have annular projections, arcuate projections or circular projections.

In this metal gasket, the surfaces of the bead plates have non-metal layers thereon. The intermediate plate is formed out of a metal softer than the metal out of which the bead plates are formed.

This metal gasket can be provided with third stopper portions in the regions on the outer side of the beads, and the third stopper portions meet each other in the regions between among the combustion chamber holes to form common portions.

This metal gasket can be formed by only a pair of bead plates and a single intermediate plate, and additional members, such as spacers are not used to form compensation portions on the intermediate plate. It is not necessary to assemble and fix anything on the intermediate plate. This metal gasket is capable of protecting the beads on the bead plates by preventing the total compression thereof; securing the sealability thereof with respect to the beads; having the function of the beads display properly at all times; having the stopper portions fulfill their bead sealing function; improving the durability of the beads; rendering unnecessary the spacer members used in a conventional metal gasket; reducing the number of parts; simplifying the shapes to which the parts are to be formed; reducing the manufacturing cost by reducing the manufacturing steps; improving the part manufacturing precision; reducing an accumulated error; easily controlling the height of the stopper portions; improving the sealing performance by reducing the number of inter-layer clearances; and improving the reliability. Since the intermediate plate is not provided with folded portions, bending stress does not occur, nor do cracks occur therein. This enables the durability of the intermediate plate to be improved.

When this metal gasket is tightened by bolts between the opposed surfaces of a cylinder head and a cylinder block, the bead plates held therebetween approach the intermediate plate gradually with the beads thereon bent, and finally engage the intermediate plate. During this time, the annular portions of the single intermediate plate which are surrounded by the first and second stepped portions thereof constitute compensation portions with respect to one bead plate, while the annular regions closer to the holes than to the mentioned second stepped portions work as compensation portions with respect to the other bead plate. Accordingly, the amount of deformation of the bead plates is restricted after the bead plates have contacted the relative compensation portions, and the bead plates are not deformed to such an extent that the beads come to a total compression in which the beads are completely crushed. Therefore, the elastic effect of the beads remains, and the function of the beads of offsetting the irregularity of the opposed surfaces necessarily comes to be displayed. The height of the stepped portions constituting the compensation portions is smaller than that of the beads with respect to the surfaces of the intermediate plate. Therefore, although the compensation portions are formed by the stepped portions, the rigidity thereof is high, and, even when the compensation portions are deformed by being tightened, the function thereof as compensation portions is not spoiled.

When the height of the second stepped portions in this metal gasket is set twice as large as that of the first stepped portions, the height of the compensation portions for one bead plate with respect to one flat surface of the intermediate plate becomes equal to that of the compensation portions for the other bead plate with respect to the other flat surface of the intermediate plate, so that it is expected that a difference does not occur in the actions of the compensation portions for the respective bead plates the dynamic characteristics of which are identical with each other. In this case, the two bead plates are balanced well in the condition of stress occurring due to the compression thereof. Consequently, the stress fluctuation in the bead plates and the bending stress imparted to the compensation portions of the intermediate plate do not fall partially on one bead plate and compensation portions only but they are imposed evenly on the two bead plates and compensation portions. This enables the occurrence of the permanent set in fatigue and breakage of the bead plates, the breakage of the compensation portions and a decrease in the sealing effect to be prevented, and a stable effect to be displayed.

When the thickness of the intermediate plate in this metal gasket is set to not less than twice as large as that of the bead plates, the occurrence of bending stress in the stepped portions provided so as to form the compensation portions cannot be avoided at the time of tightening the metal gasket but the stepped portions restrain the deformation of the intermediate plate. Accordingly, the amount of deformation of the compensation portions becomes much smaller than that of the beads which are being crushed of the bead plates, and the functions of the intermediate plate and compensation portions can be maintained.

The stopper portions on the intermediate plate can be provided on the cylinder head side, cylinder block side or both sides of the intermediate plate in the condition of a gasket installing operation, and the height of the stopper portions can be set to various levels correspondingly to that of the beads. Accordingly, the levels at which a total compression of the beads can be prevented, and at which the sealability of the beads can be retained, can be set properly, and the surface pressure balance with respect to the opposed mounting surfaces of the two bead plates can be changed suitably. This allows the stress fluctuation in the bead plates and the bending stress imparted to the compensation portions to be set in accordance with the condition of a case where, for example, there is a difference between the characteristics of bead plates. Consequently, the breakage of the beads on the bead plates and compensation portions, and a decrease in the sealing effect thereof can be prevented, and a stable sealing effect can be displayed.

DESCRIPTION OF THE PREFERRED EMBODIMENTS

Figure 1:
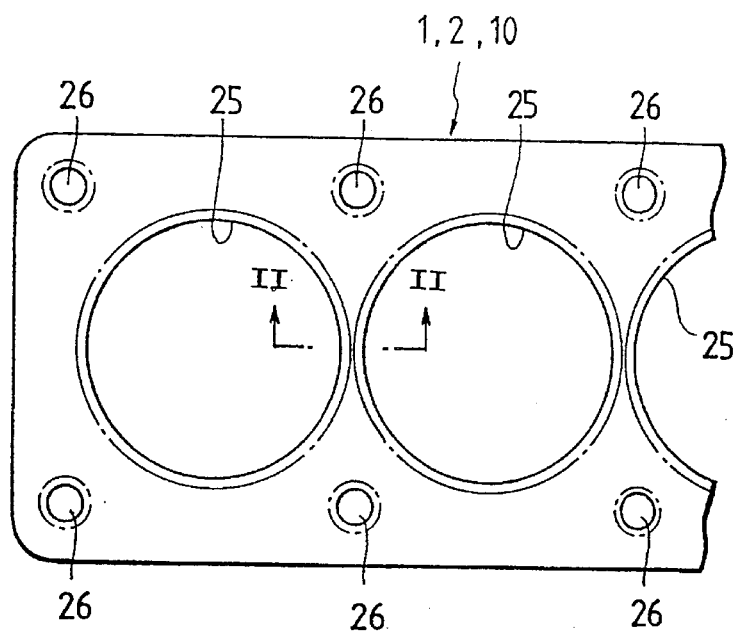
FIG. 1 is a partial plan view of the metal gasket according to the present invention.

The embodiments of the metal gasket according to the present invention will now be described with reference to the drawings. This metal gasket is held between, for example, a cylinder head and a cylinder block, or a cylinder head and a manifold so as to seal a narrow space between the opposed surfaces thereof. This metal gasket is provided with cylinder bore holes, i.e. combustion chamber holes correspondingly to cylinder bores formed in a cylinder block, or combustion gas holes corresponding to exhaust passages of an exhaust manifold.

In each of the following embodiments, a cylinder gasket applied to a multicylinder engine is described. In each of the drawings showing the embodiments, the same reference numerals are attached to parts having the same construction and function, and the duplication of descriptions thereof is omitted.

Figure 2:
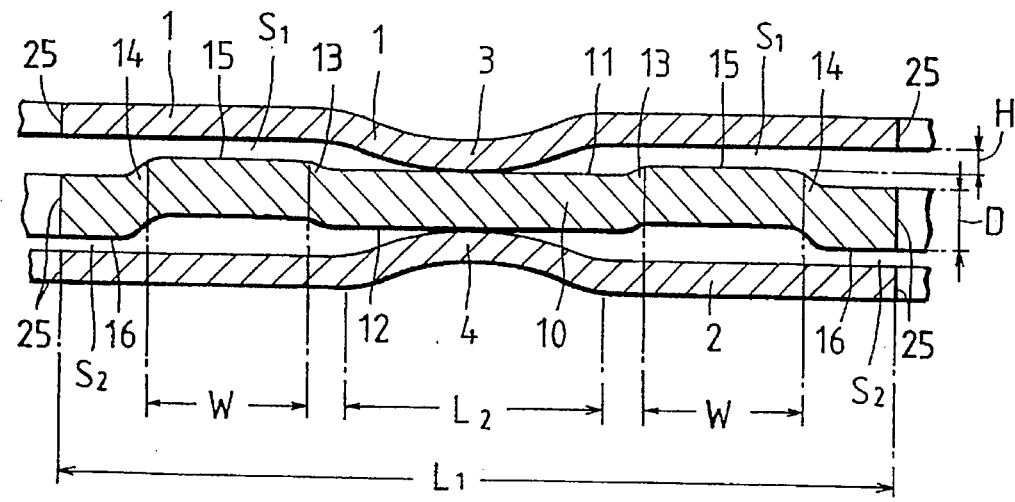
FIG. 2 is an enlarged sectional view showing one embodiment of the metal gasket according to the present invention and taken along the line II—II in FIG. 1.
Figure 3:
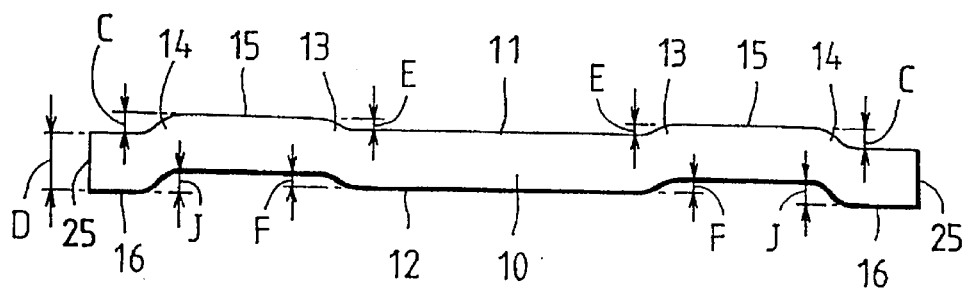
FIG. 3 is a partial enlarged illustration of an intermediate plate constituting the metal gasket of FIG. 2.

An embodiment of this metal gasket will now be described with reference to FIGS. 1, 2 and 3. This metal gasket has a plurality each of various kinds of holes (not shown), such as water holes, oil holes and knock holes besides bolt holes 26 which are formed around combustion chamber holes 25.

This metal gasket is a laminated type gasket comprising two bead plates 1, 2 formed by elastic metal plates of substantially the same thickness, and an intermediate plate 10 having a thickness larger than that of the bead plates 1, 2 and interposed between the two bead plates 1, 2. The bead plates 1, 2 and intermediate plate 10 are provided with combustion chamber holes 25 in the corresponding portions thereof. The bead plates 1, 2 are provided with cross-sectionally projecting beads 3, 4 extending along the circumferences of the combustion chamber holes 25 so as to surround these holes substantially concentrically therewith and annularly therearound. The beads 3, 4 are disposed so that the projecting portions of the same shape are opposed to each other, and they contact surfaces 11, 12 of the intermediate plate 10 in the condition in which the intermediate plate is laminated on and held between the bead plates. In this metal gasket, for example, a distance $L_1$ between adjacent combustion chamber holes 25 is set to about 6.00 mm, a thickness of the bead plates 1, 2 0.2–0.3 mm, a radial width $L_2$ of beads 3, 4 about 2.5 mm, and a height H of the beads 4 0.27 mm.

The intermediate plate 10 is provided on the regions thereof which are closer to combustion chamber holes 25 than to the portions thereof contacting the beads 3, 4 with stopper portions comprising first stepped portions 13, extending toward one bead plate 1 and having a height E smaller than both the height H of the beads 3 and a thickness D of the intermediate plate 10, in such a manner that the stopper portions extend annularly, surround the combustion chamber holes 25 have a uniform thickness over the whole region thereof. The stepped portions 13 are formed on the intermediate plate 10 by a metal sheeting process so that the stepped portions constitute stopper portions bent and extending smoothly and continuously and having a sealing function. The opposite surface 12 of the intermediate plate 10 is also provided with stepped portions F the height of which is equal to E. The intermediate plate 10 is also provided on the parts thereof which are between the stepped portions 13 and combustion chamber holes 25 with stopper portions bent and extending annularly, smoothly and continuously along circumferences of the combustion chamber holes 25, having a sealing function and comprising second stepped portions 14 which extend toward the bead plate 2 and have a height C larger than that of the stepped portions 13 but smaller than the sum of the height E of the stepped portions 13 and that H of the beads 4. On the opposite surface of the 12 of the intermediate plate 10, stepped portions J, which have a height equal to that C of the stepped portions 14 and a cross-sectional shape similar to that thereof, occur in the same manner as in the case of the stepped portions 13. As a result, the annular regions between the two stepped portions 13, 14 form flat hills constituting stopper portions, i.e. compensation portions 15 for the bead plate 1, while the annular regions extending from the stepped portions 14 to the combustion chamber holes 25 also form flat hills constituting stopper portions, i.e. compensation portions 16 for the bead plate 2.

When the metal gasket is in a free state in which it is not yet tightened, a clearance $S_1$ is formed between the compensation portions 15 and bead plate 1, and a clearance $S_2$ between the compensation portions 16 and bead plate 2. The height J of the stepped portions 14 of the intermediate plate 10 is preferably set twice as large as that C of the stepped portions 13. In this case, the height of the compensation portions 16 measured from the surface 12 becomes equal to that of the compensation portions 15 measured from the surface 11, and clearances $S_1$, $S_2$ of the same distance are formed between the compensation portions 15, 16 and bead plates 1, 2. For example, the thickness of the intermediate plate 10 is set to 0.5–1.0 mm, which is not less than twice as large as that of the bead plates 1, 2. The height of the stepped portions 13 is set to 0.04–0.15 mm, and that of the stepped portions 14 0.08–0.15 mm and preferably twice as large as the height of the stepped portions 13.

When the metal gasket is placed between the opposed surfaces of a cylinder head and a cylinder block and tightened by bolts, the beads 3, 4 on the bead plates 1, 2 are crush-deformed to gradually approach and engage the intermediate plate 10. The amount of displacement of the bead plates 1, 2 after the engagement thereof with the intermediate plate 10 is restricted by the compensation portions 15, 16 respectively of the intermediate plate 10 so as to prevent the total compression of the beads 3, 4 and retain the function thereof. Since the height measured from the surface of the intermediate plate 10 of the stepped portions 13, 14 constituting the compensation portions 15, 16 is smaller than that of the beads 3, 4, the rigidity of the compensation portions 15, 16 and stepped portions 13, 14 is high. Therefore, even if the compensation portions are deformed when the metal gasket is tightened, the function of the compensation portions is not spoiled. Since it is possible to prevent the beads 3, 4 from being totally compressed, an excellent scalability thereof can be secured, and the amplitude of stress of the bead plates 1, 2 becomes small, so that large bending stress and stress amplitude do not occur. Consequently, cracks and permanent set in fatigue do not occur in the bead plates 1, 2. The compensation portions 15, 16 also have a function of offsetting the irregularity occurring in the opposed surfaces when the metal gasket is tightened.

When the height of the stepped portions 14 is set twice as large as that of the stepped portions 13, the height E of the compensation portions 15 for the bead plate 1 which is measured from one surface 11 of the intermediate plate 10 becomes equal to that (=J−F) of the compensation portions 16 for the bead plate 2 which is measured from the other surface 12 of the intermediate plate 10. It is expected in this case that the operations of the compensation portions 15, 16 against the bead plates 1, 2 become identical. The condition of stress occurring in the bead plates 1, 2 when the metal gasket is tightened is balanced well, and the stress is not partially imparted to either one of the bead plates.

When the thickness D of the intermediate plate 10 is set twice as large as that of the bead plates 1, 2, the amount of the deformation of the compensation portions 15, 16 occurring when the metal gasket is tightened becomes sufficiently small as compared with that of the crushing deformation of the beads 3, 4 of the bead plates 1, 2, and the function of the compensation portions 15, 16 of the intermediate plate 10 can be maintained. The intermediate plate is formed out of a metal softer than that out of which the bead plates 1, 2 are formed. For example, the bead plates 1, 2 are formed out of SUS301, and the intermediate plate 10 serving as a regulating plate by SECC (soft steel plate).

Figure 4:
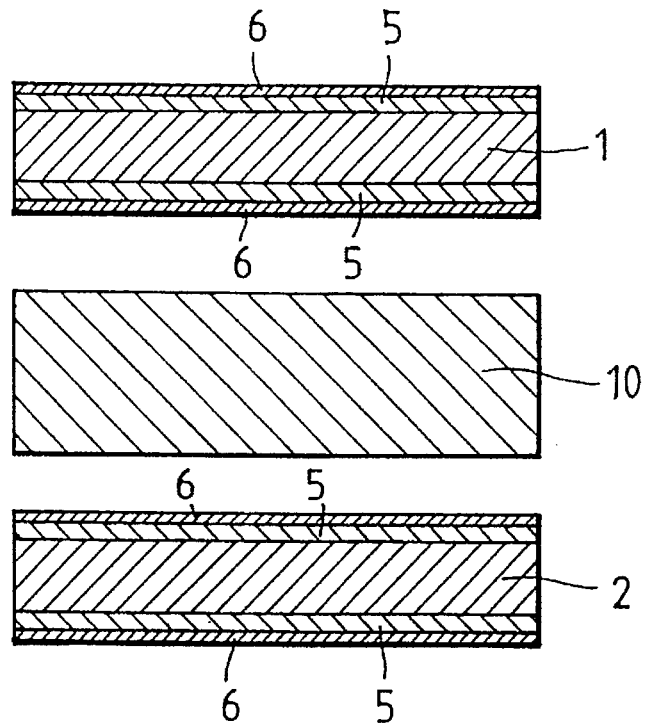
FIG. 4 is an exploded view illustrating bead plates and intermediate plate in this metal gasket.

As shown in FIG. 4, the surfaces of the bead plates 1, 2 are provided with a layer of coating of a heat resisting and oil resisting nonmetallic material having a thickness of, for example, around 10–50 μm. Owing to the layer of coating, the metal-to-metal contact of the metal gasket with the cylinder head and cylinder block is avoided, and the corrosion resistance, durability and strength of the metal gasket are secured. For example, fluororubber 5 having a heat resistance and an oil resistance is applied to the upper and lower surfaces of the bead plates 1, 2, and then an acrylic silicone resin 6 to the outer surfaces of the fluororubber 5. The nonmetallic material applied to the surfaces of the bead plates 1, 2 cover the minute projections and recesses, if any, which would occur during the machining of the bead plates 1, 2, so that the bead plates display their sealing functions sufficiently.

Figure 5:
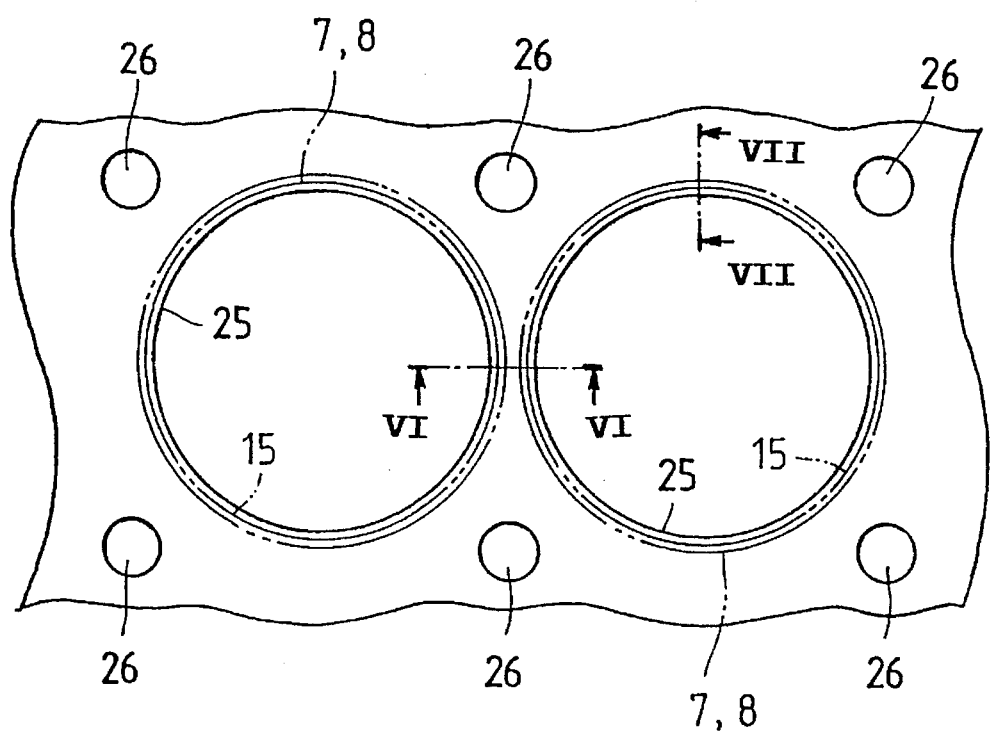
FIG. 5 is a plan view showing another embodiment of the metal gasket according to the present invention.
Figure 6:
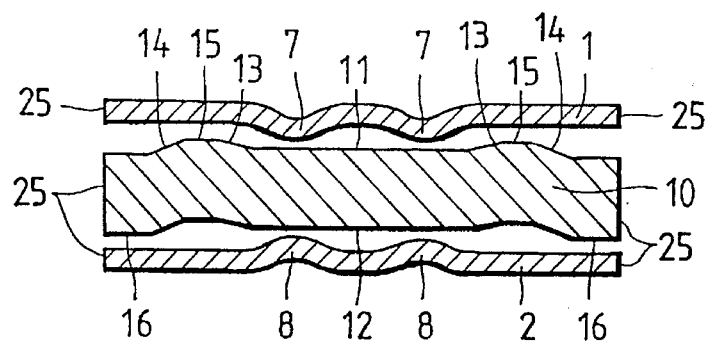
FIG. 6 is a sectional view taken along the line VI—VI in FIG. 5.
Figure 7:
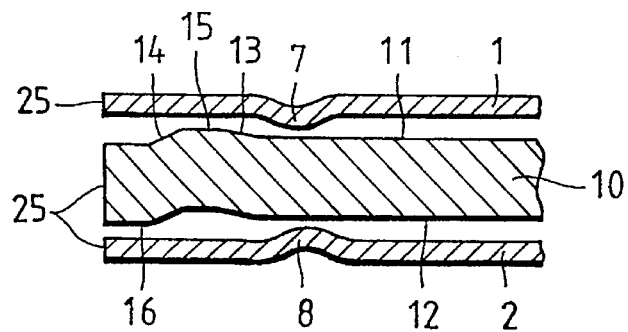
FIG. 7 is a sectional view taken along the line VII—VII in FIG. 5.

Another embodiment of the metal gasket according to the present invention will now be described with reference to FIGS. 5, 6 and 7. The embodiment shown in FIGS. 5–7 has the same construction and function as the embodiment shown in FIGS. 1–3 except that beads formed on bead plate 1, 2 do not meet each other in regions between adjacent combustion chamber holes 25. Namely, the beads 7, 8 formed on the bead plates 1, 2, respectively do not meet in regions between adjacent combustion chamber holes 2, and they are formed independently.

In this embodiment, compensation portions 15 (stopper portions) formed by stepped portions 13 on an intermediate plate 10 project toward the bead plate 1 disposed on the side of a cylinder head, while compensation portions 16 (stopper portions) formed by stepped portions 14 project toward the bead plate 2 disposed on the side of a cylinder block. In this embodiment, the thickness of the intermediate plate 10 is set around 3–5 times as large as that of the bead plates 1, 2. For example, the thickness of the bead plates 1, 2 can be set to 0.2–0.3 mm, and the thickness of the intermediate plate 10 0.5–0.8 mm. The height of the stopper portions 15 formed on the intermediate plate 10 is set to 30–60 μm, and that on the beads 7, 8 on the bead plates 1, 2 0.20–0.25 mm.

Figure 8:
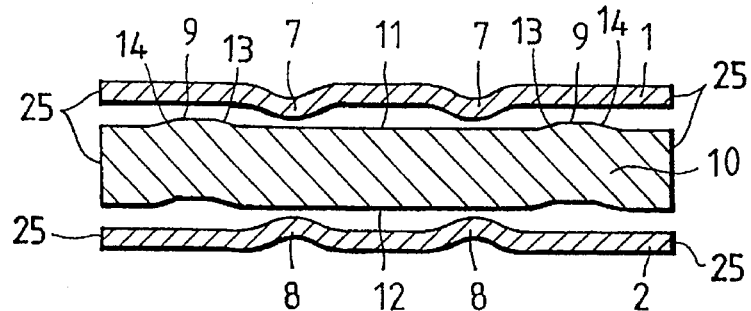
FIG. 8 is a sectional view, which is taken along a line corresponding to the line VI—VI in FIG. 5, of a portion of still another embodiment.
Figure 9:
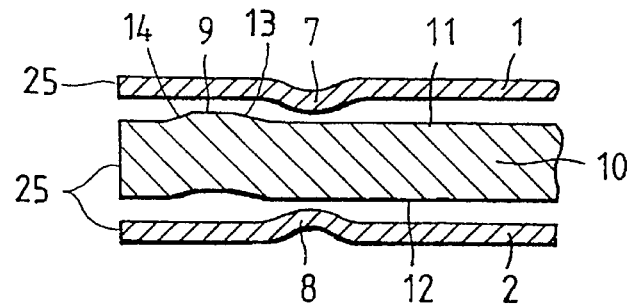
FIG. 9 is a sectional view, which is taken along a line corresponding to the line VII—VII in FIG. 5, of a portion of the same embodiment.

Still another embodiment of the metal gasket according to the present invention will now be described with reference to FIGS. 8 and 9. The embodiment shown in FIGS. 8 and 9 is different from that shown in FIG. 6 in that stepped portions 13, 14 on an intermediate plate 10 are formed into stopper portions 9 of the same height. The intermediate plate 10 is provided on the regions thereof which extend along the inner sides of the beads 3, 4 with stopper portions 9 projecting toward the bead plate 1 to a height smaller than that of the beads 3. The stopper portions 9 are formed on the side of the intermediate plate which faces the bead plate 1, and no stepped portions for the bead plate 2 on the side of the intermediate plate which faces the bead plate 2. In this embodiment, the bead plate 1 is disposed on the side of a cylinder head, and the bead plate 2 on the side of a cylinder block.

Figure 10:
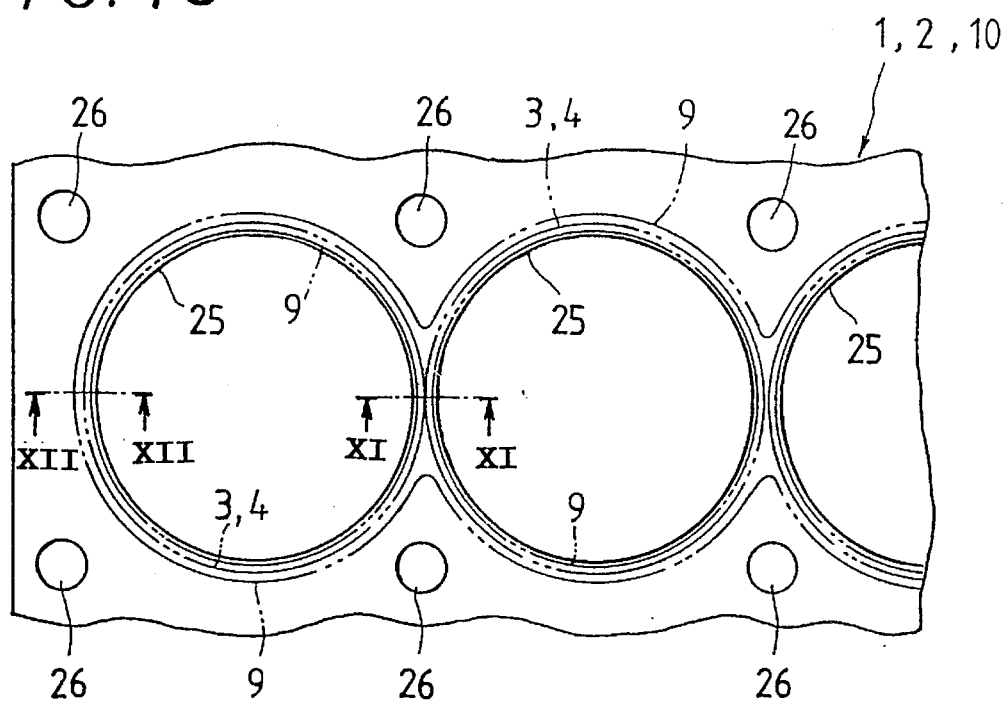
FIG. 10 is a plan view of another embodiment of the metal gasket.
Figure 11:
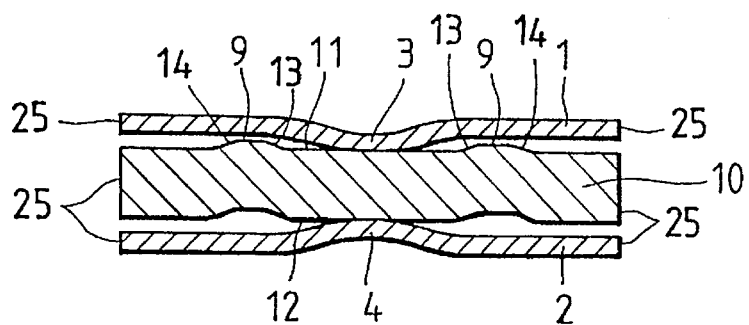
FIG. 11 is a sectional view taken along the line XI—XI in FIG. 10.
Figure 12:
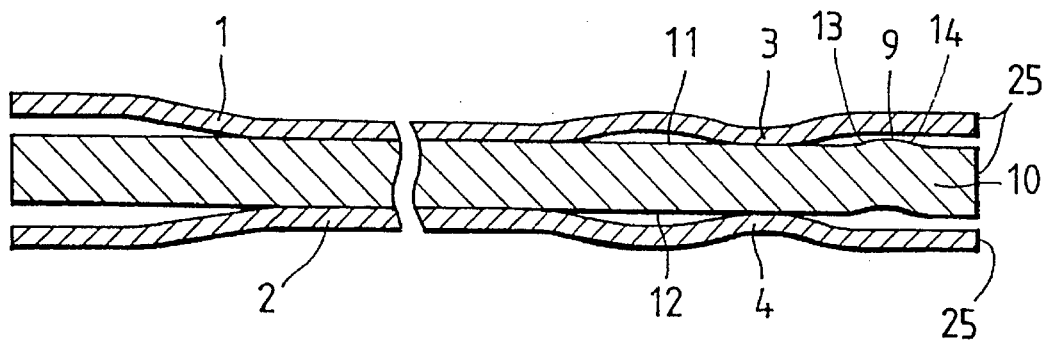
FIG. 12 is a sectional view taken along the line XII—XII in FIG. 10.

A further embodiment of the metal gasket will now be described with reference to FIGS. 10, 11 and 12. The embodiment shown in FIG. 11 is different from the embodiment shown in FIG. 2 in that stepped portions formed on an intermediate plate 10 constitute stopper portions 9 of the same height. The intermediate plate 10 is provided on the regions thereof which extend along the inner sides of beads 3, 4 with stopper portions 9 comprising stepped portions 13, 14 projecting toward a bead plate 1 to a height smaller than that of the beads 3. The stopper portions 9 are formed on the side of the intermediate plate 10 which faces the bead plate 1, and stepped portions projecting toward a bead plate 2 are not provided on the side of the intermediate plate 10 which faces the bead plate 2. In this embodiment, the thickness of the intermediate plate 10 is set around 3–5 times as large as that of the bead plates 1, 2. The bead plate 1 is disposed on the side of a cylinder head, and the bead plate 2 on the side of a cylinder block.

Figure 13:
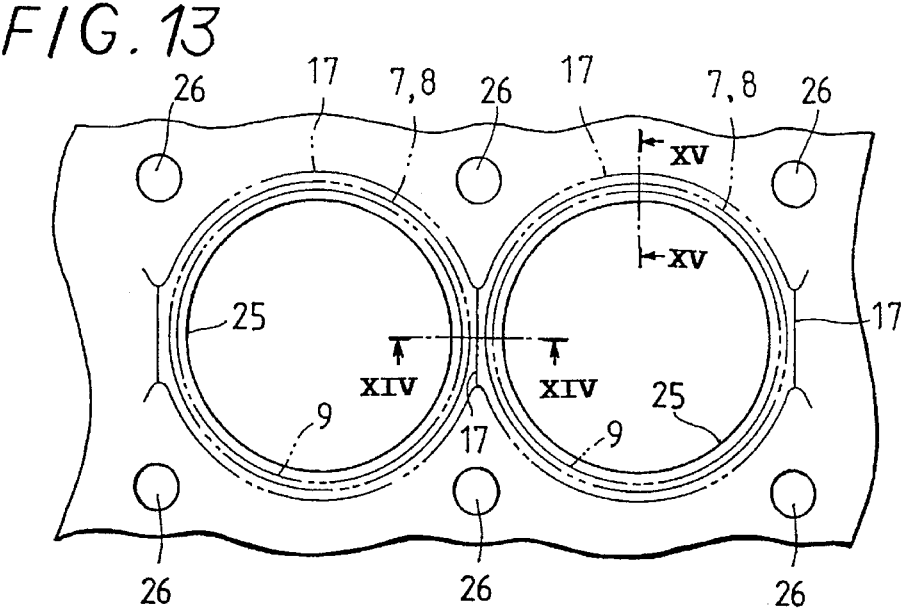
FIG. 13 is a plan view showing a further embodiment of the metal gasket according to the present invention.
Figure 14:
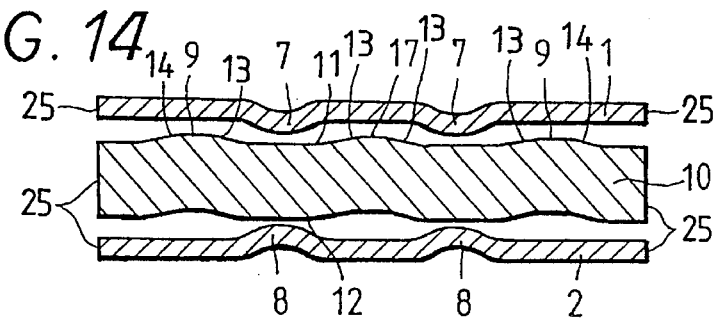
FIG. 14 is a sectional view taken along the line XIV—XIV in FIG. 13.
Figure 15:
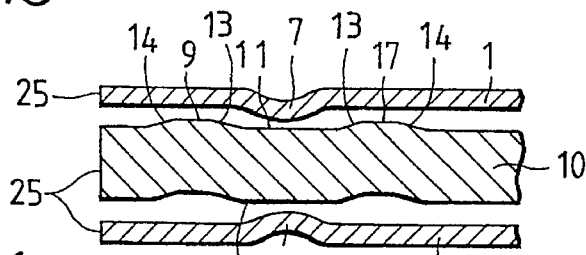
FIG. 15 is a sectional view taken along the line XV—XV in FIG. 13.

Another embodiment of the metal gasket according to the present invention will now be described with reference to FIGS. 13, 14 and 15. The embodiment shown in FIG. 14 is different from that shown in FIG. 8 in that an intermediate plate 10 is provided with stopper portions on the regions thereof which correspond to the inner and outer sides of relative beads. Namely, the intermediate plate 10 is provided on the parts thereof which correspond to the inner sides of beads 7 with stopper portions 9 comprising stepped portions 13, 14, and on the parts thereof which correspond to the outer sides of the beads 7 with stopper portions 17 comprising stepped portions 13. These stopper portions 17 formed on the parts of the intermediate plate which correspond to the outer sides of the beads 7, 7 meet each other in the regions thereof which are between combustion chamber holes 25 to form common stopper portions.

Figure 16:
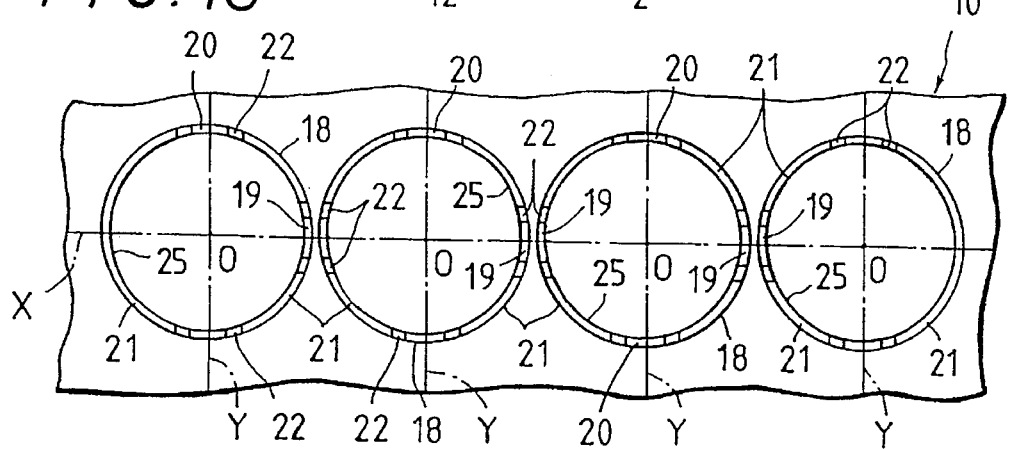
FIG. 16 illustrates another embodiment of the metal gasket according to the present invention.
Figure 17:
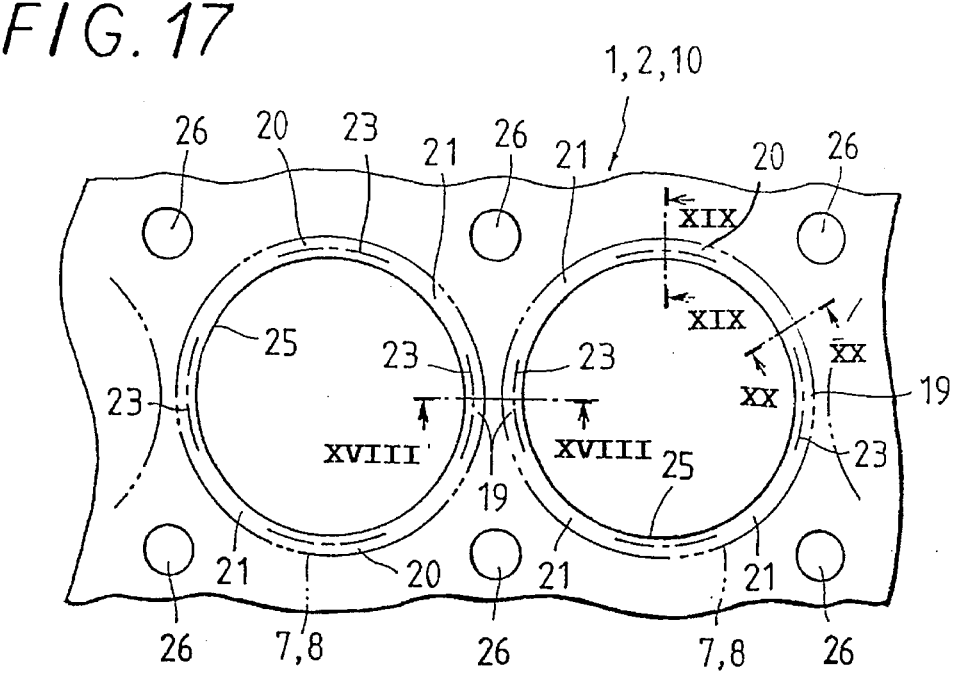
FIG. 17 is a plan view showing a further embodiment of the metal gasket according to the present invention.
Figure 18:
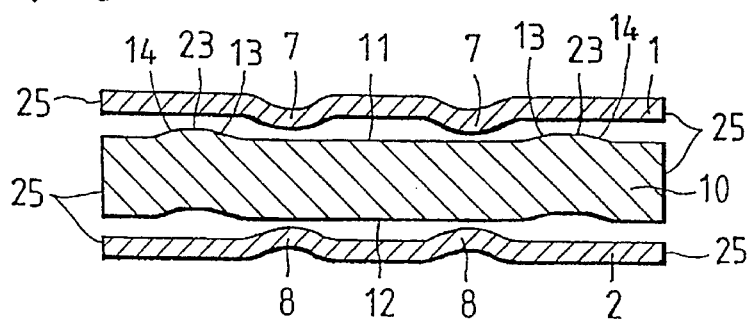
FIG. 18 is a sectional view taken along the line XVIII—XVIII in FIG. 17.
Figure 19:
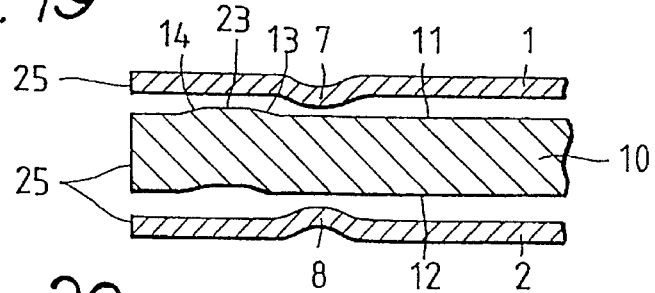
FIG. 19 is a sectional view taken along the line XIX—XIX in FIG. 17.
Figure 20:
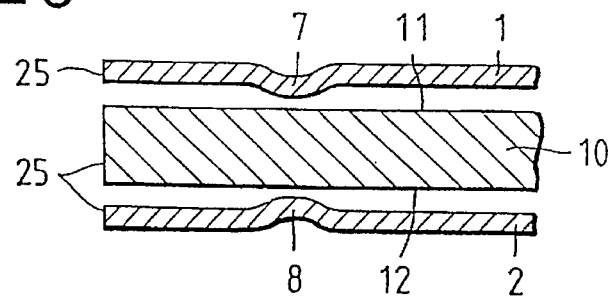
FIG. 20 is a sectional view taken along the line XX—XX in FIG. 17.
Figure 21:
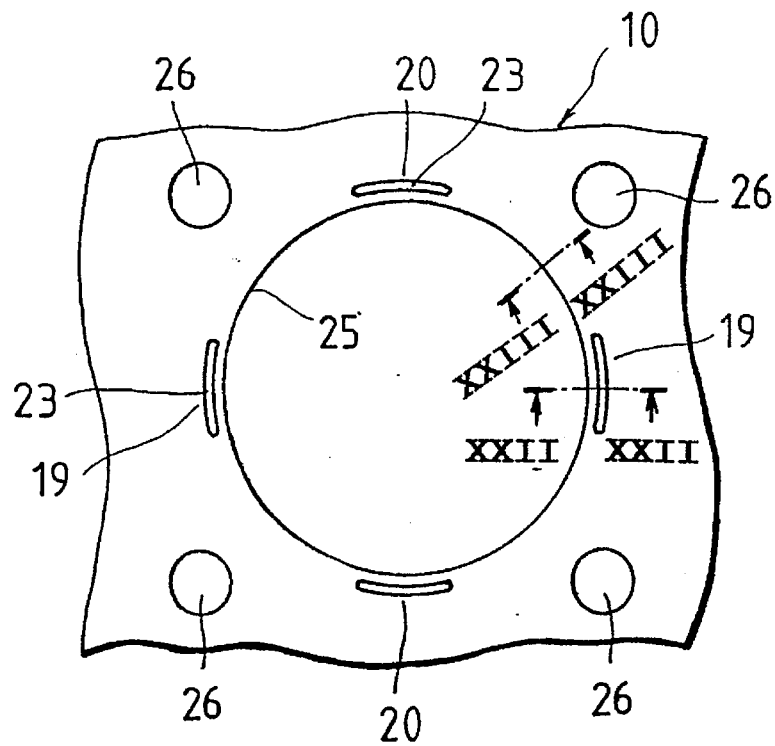
FIG. 21 is a plan view showing an intermediate plate in the metal gasket of FIG. 17.
Figure 22:
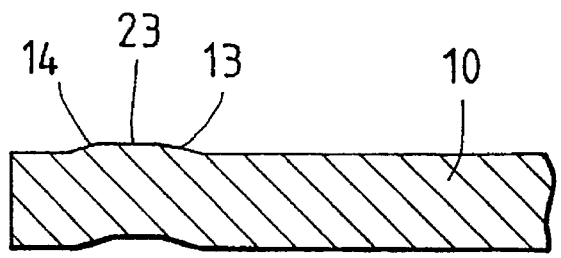
FIG. 22 is a sectional view taken along the line XXII—XXII in FIG. 21.
Figure 23:
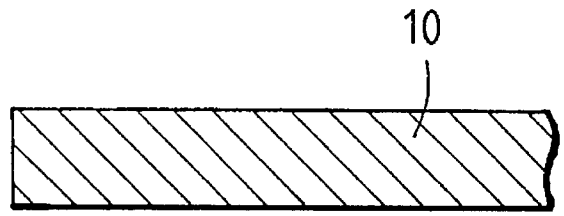
FIG. 23 is a sectional view taken along the line XXIII—XXIII in FIG. 21.

Another embodiment of the metal gasket according to the present invention will now be described with reference to FIG. 16. The stopper portions 18 formed on an intermediate plate 10 are high in regions 19 between combustion holes 25, and in regions 20 on axes Y which are perpendicular to a center line X passing the centers 0 of the combustion chamber holes, and which pass the same centers 0, and low in the other regions 21. The stopper portions 18 have smooth curved surfaces of varying height in boundary regions 22 between the high regions 20 and low regions 21. For example, the stopper portions 18 formed on the intermediate plate 10 are formed to a height of around 60 μm in the regions 19, 20, and around 30 μm in the regions 21. The height of these stopper portions 18 is varied so that it is large in regions far from bolt tightening positions in which a cylinder head is fixed to a cylinder block, and the stopper portions of a varying height have a function of equalizing the surface pressure of the beads on bead plates. The stopper portions may be formed high in regions 19 between combustion chamber holes 25 and low in regions other than between combustion chamber holes 25, as required.

Still another embodiment of the metal gasket will now be described with reference to FIGS. 17–23. This embodiment is different from the embodiment shown in FIG. 8 in that stopper portions 23 on an intermediate plate 10 are formed intermittently along combustion chamber holes 25. Namely, the intermediate plate 10 is provided with stopper portions 23 comprising stepped portions 13, 14 on arcuate regions 19 between combustion chamber holes 25, and on arcuate regions 20 on axes Y which are perpendicular to a center line X passing the centers 0 of the combustion chamber holes 25, and which pass the same centers 0. The stopper portions 23 are not formed on the other regions 21. The stopper portions 23 have smooth curved surfaces of varying height on boundary regions between the regions 19, 20 and the regions 21. Accordingly, the stopper portions 23 on the intermediate plate 10 are on the regions farthest away from the positions of bolts by which a cylinder head and a cylinder block are combined, and they can fulfil their function of maintaining a predetermined amount of surface pressure of the beads in regions in which the fastening stress of these bolts becomes small with respect to the beads on the bead plates.

Figure 24:
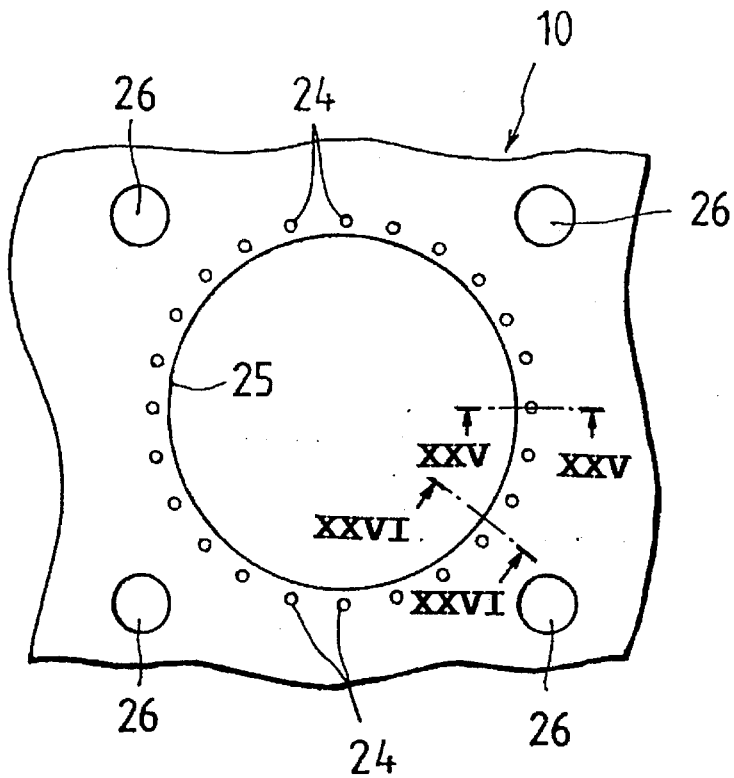
FIG. 24 is a plan view showing the intermediate plate in this metal gasket.
Figure 25:
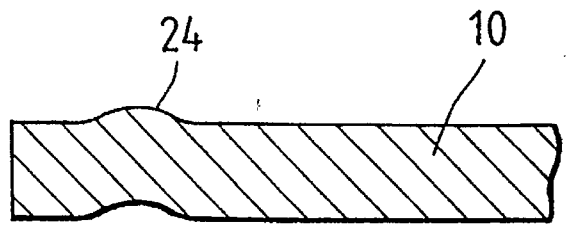
FIG. 25 is a sectional view taken along the line XXV—XXV in FIG. 24.
Figure 26:
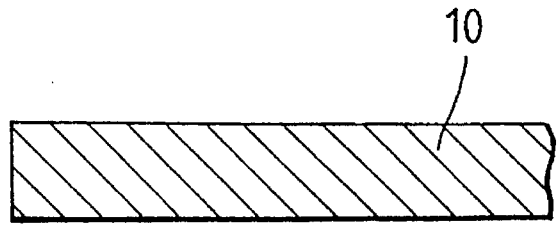
FIG. 26 is a sectional view taken along the line XXVI—XXVI in FIG. 24.
Figure 27:
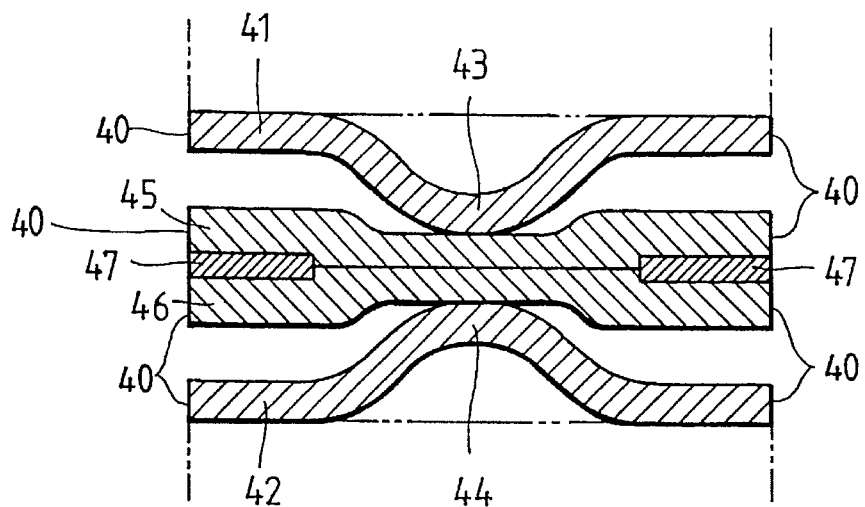
FIG. 27 is a sectional view showing an example of conventional metal gasket.
Figure 28:
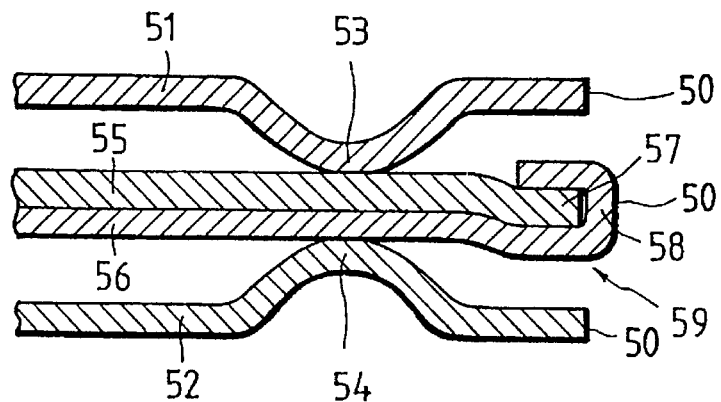
FIG. 28 is a sectional view showing another example of a conventional metal gasket.
Figure 29:
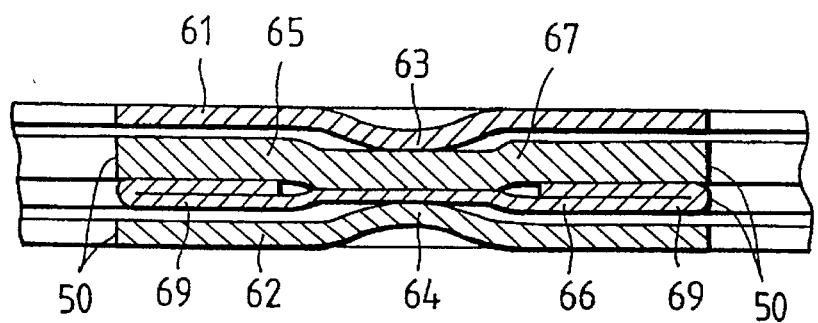
FIG. 29 is a sectional view showing still another example of a conventional metal gasket.

A further embodiment of the metal gasket according to the present invention will now be described with reference to FIGS. 24–26. This embodiment is different from the embodiment shown in FIG. 21 in that many stoppers 24 on an intermediate plate 10 are formed in the form of circular projections arranged intermittently along the circumferences of combustion chambers 25. The height of the projecting parts of the stopper portions 24 can be changed properly in accordance with the relative regions.

What is claimed is:

1. A metal gasket comprising;
   a pair of bead plates formed by elastic metal plates provided with parallelly aligned holes and beads formed along the circumferences of said holes, said beads on said bead plates being provided in mutually opposed relation,
   an intermediate plate which has holes corresponding to said holes in said bead plates, and which is interposed between said bead plates, said intermediate plate being formed by a single plate of a substantially uniform thickness having no folded portions at circumferential edges of said holes, said intermediate plate being provided with stepped portions constituting stopper portions having a sealing function,
   said stepped portions being provided on the regions of said intermediate plate which extend at least along said holes and are away from said beads on said bead plates toward said holes, said stepped portions comprising a continuous bend of said intermediate plate toward said bead plates to a height smaller than the bead height of said beads, and
   said stepped portions of said intermediate plate comprising first stepped portions formed in the regions thereof which are closer to said holes than to said beads so as to extend toward one of said bead plates with a height smaller than the bead height of said beads, and
   second stepped portions formed in the regions of said intermediate plate which are on the inner side of said first stepped portions so as to extend toward the other bead plate with a height larger than that of said first stepped portions and smaller than the sum of the height of said first stepped portions and the bead height of said beads.

2. A metal gasket according to claim 1, wherein the thickness of said intermediate plate is set to not less than twice as large that of said bead plates.

3. A metal gasket according to claim 2, wherein the thickness of said intermediate plate is set to substantially 3–5 times as large as that of said bead plates.

4. A metal gasket according to claim 1, wherein the height of said second stepped portions is twice as large as that of said first stepped portions.

5. A metal gasket according to claim 1, wherein said first stepped portions constitute first compensation portions for preventing a total compression of said beads on one bead plate, said second stepped portions constituting second compensation portions for preventing a total compression of said beads on the other bead plate.

6. A metal gasket according to claim 1, wherein said stepped portions are formed to a large height in the regions disposed circumferentially between said holes, and to a small height in the other regions.

7. A metal gasket according to claim 6, wherein said stepped portions have smooth curved surfaces of varying height in boundary parts between parts of a large height and those of a small height.

8. A metal gasket according to claim 1, wherein said stepped portions are formed to a large height in the regions disposed circumferentially between said holes and the regions on axes which are perpendicular to a center line passing the centers of said holes, and which pass said centers, and to a small height in the other regions.

9. A metal gasket according to claim 8, wherein said stepped portions have smooth curved surfaces of varying height in boundary parts between parts of a large height and those of a small height.

10. A metal gasket according to claim 1, wherein the surfaces of said bead plates have a nonmetal layer thereon.

11. A metal gasket according to claim 1, wherein said intermediate plate is formed out of a metal softer than out of which said bead plates are formed.

* * * * *